US010638279B2

(12) United States Patent
Ryder et al.

(10) Patent No.: US 10,638,279 B2
(45) Date of Patent: Apr. 28, 2020

(54) METHOD AND SYSTEM FOR GENERATING LOCAL MOBILE DEVICE NOTIFICATIONS

(71) Applicant: OpenBack Limited, Dublin (IE)

(72) Inventors: Christian Ryder, Dublin (IE); David Shackleton, Dublin (IE); Nicolas Pabion, Dublin (IE)

(73) Assignee: OpenBack Limited, Dublin (IE)

( * ) Notice: Subject to any disclaimer, the term of this patent is extended or adjusted under 35 U.S.C. 154(b) by 0 days.

(21) Appl. No.: 16/316,012

(22) PCT Filed: Jul. 6, 2017

(86) PCT No.: PCT/EP2017/067041
§ 371 (c)(1),
(2) Date: Jan. 7, 2019

(87) PCT Pub. No.: WO2018/007568
PCT Pub. Date: Jan. 11, 2018

(65) Prior Publication Data
US 2019/0253849 A1    Aug. 15, 2019

Related U.S. Application Data

(60) Provisional application No. 62/360,054, filed on Jul. 8, 2016.

(30) Foreign Application Priority Data
Jul. 8, 2016    (EP) .................................. 16178669

(51) Int. Cl.
H04W 4/20    (2018.01)
H04W 4/029    (2018.01)
(Continued)

(52) U.S. Cl.
CPC .............. *H04W 4/20* (2013.01); *G06F 16/27* (2019.01); *G06F 21/554* (2013.01); *G06N 20/00* (2019.01);
(Continued)

(58) Field of Classification Search
CPC ...... H04M 15/83; H04M 15/84; H04M 15/85; H04M 1/72566; H04M 15/86;
(Continued)

(56) References Cited

U.S. PATENT DOCUMENTS 9,008,629 B1    4/2015    Masterman
9,443,230 B2 *  9/2016    Pratt ....................... H04L 51/38
(Continued)

FOREIGN PATENT DOCUMENTS

WO    199923579    5/1999

OTHER PUBLICATIONS

International Search Report and Written Opinion received in PCT/EP2017/067041, dated Oct. 5, 2017, 12 pages.
(Continued)

*Primary Examiner* — Said M Elnoubi
(74) *Attorney, Agent, or Firm* — ARC IP Law, PC; Joseph J. Mayo

(57) ABSTRACT

A system and method that generate a local electronic user notification at a personal computing device about a data processing application stored therein. A manager module selects a predetermined notification format, a predetermined local trigger event and associates the selected format and the selected trigger event with the data processing application. A synchronizing module loads and stores notification data when the device is connected to a network. A monitoring module monitors local hardware and data processing events at the device in real time, irrespective of whether the device is connected to a network. A notification engine compares
(Continued)

monitored events against the selected trigger event and, upon matching a selected trigger event with a monitored event, formats the stored notification data according to a selected predetermined notification format to generate the local electronic user notification at the device, and outputs the generated local notification to a user interface of the device.

18 Claims, 9 Drawing Sheets

(51) Int. Cl.
    *G06N 20/00*     (2019.01)
    *G06F 21/55*     (2013.01)
    *H04W 4/12*     (2009.01)
    *H04L 12/58*     (2006.01)
    *H04L 29/08*     (2006.01)
    *G06F 16/27*     (2019.01)
    *G06F 3/14*     (2006.01)
    *H04W 4/02*     (2018.01)

(52) U.S. Cl.
    CPC .............. *H04L 51/06* (2013.01); *H04L 51/14* (2013.01); *H04L 67/26* (2013.01); *H04L 67/306* (2013.01); *H04W 4/029* (2018.02); *H04W 4/12* (2013.01); *G06F 3/14* (2013.01); *G06F 2221/2103* (2013.01); *G09G 2354/00* (2013.01); *H04L 51/24* (2013.01); *H04W 4/02* (2013.01)

(58) Field of Classification Search
    CPC ..... G06F 21/554; G06F 9/542; G06Q 10/109; G06Q 10/10; G06Q 10/1095; G06Q 10/063116; H04W 68/00
    See application file for complete search history.

(56) References Cited

U.S. PATENT DOCUMENTS

| | | | |
|---|---|---|---|
| 10,324,733 B2* | 6/2019 | Won | G06F 9/442 |
| 2010/0075652 A1 | 3/2010 | Keskar et al. | |
| 2013/0346408 A1* | 12/2013 | Duarte | G06Q 10/10 707/737 |
| 2015/0237475 A1 | 8/2015 | Henson et al. | |
| 2017/0086018 A1* | 3/2017 | Wagner | G06Q 20/12 |

OTHER PUBLICATIONS

Al Nahian, Jaber, "Whatsapp Message Sent, Delivered and Read Status Identification using Indicators and Tick Marks", TechGainer.com, Mar. 31, 2015, 6 pages.

Mediati, Nick, "Master Notifications in Android Lollipop with Notification Priority and Downtime", Greenbot from IDG, Dec. 3, 2014, 8 pages.

* cited by examiner

METHOD AND SYSTEM FOR GENERATING LOCAL MOBILE DEVICE NOTIFICATIONS

This application is a national stage entry application of International Application No. PCT/EP2017/067041, filed on 6 Jul. 2017, and which claims priority to U.S. Provisional Patent Application No. 62/360,054, filed on 8 Jul. 2016, and to European Patent Application No. 16178669.4, filed on 8 Jul. 2016, wherein the specifications and contents of which are hereby incorporated herein by reference in their entirety.

BACKGROUND OF THE INVENTION

Field of the Invention

The present invention relates to improvements in data processing methods for generating notifications addressed to the user of a personal data processing device about data processing applications installed on the device. More particularly, the present invention relates to an improved method and an improved system for generating such notifications locally.

Description of the Related Art

In the ever more ubiquitous and pervasive mobile networking environment, developers of data processing applications, commonly referred as 'apps' and which are stored and processed by personal data processing devices, typically 'smart' mobile phone handsets, are gradually generalising the sending of notification data or information from their servers to the remote apps directly, in unilateral data communications dubbed 'push notifications'. Such notifications are user notifications primarily intended to raise the awareness of a mobile terminal user about a new development concerning an app stored at the mobile terminal, be it a functional update, a status condition, an alert or any other aspect, technical or not, of the app. Such user notifications also frequently include user reply or user action input options, to be triggered by a user in the user interface of the recipient mobile terminal or of the app targeted by the user notification. The use of such user notifications is currently supplanting the use of more traditional user notification formats such as electronic mail and Short Message Service communications.

In the above context, Google, Inc.® and Apple, Inc.® the respective manufacturers of the two current main operating systems ('OS') for mobile terminals, Android® and iOS®, have developed their own mobile user notification platforms. Google Cloud Messaging, commonly abbreviated as GCM and recently renamed as Firebase Cloud Messaging ('FCM'), is a mobile user notification platform developed by Google, Inc. which enables third-party application developers to send notification data or app information from developer-run servers to apps installed within the Android OS, as well as applications, extensions or applets developed for the Chrome® web browser also manufactured by Google, Inc. Likewise, the Apple Push Notification Service, commonly abbreviated APNS, is a mobile user notification platform created by Apple, Inc. which enables third-party application developers to send notification data or app information from developer-run servers to apps installed within the iOS® OS on Apple, Inc. devices.

App developers now routinely author apps to integrate directly to Apple's APNs or Google's GCM/FCM, or use the integrating services of push notification brokers to facilitate the incorporation of this messaging functionality, such as Urban Airship®, OneSignal®, Catapush® and more. App developers are also known to use the communication profiling services of app analytics companies such as Mixpanel®, Kahuna®, Appboy® and Swrve®, who track user behaviour and events concerned with activity within the apps, and tailor push notifications based on those user events and segments of users based on those events.

Accordingly, many techniques have been developed to optimise the formatting and delivery of user data notification pushed by servers to mobile devices, variously including the delivery of push notifications to an inactive computing device, the providing of push notification delivery system with feedback analysis, the relating of user notifications to the predicted future geographic location of a mobile device, delaying or time-expiring the pushing of user notifications, and more.

In a first example, United States Patent Application US 20150237475 A1 of Henson et al discloses a method for delivering emergent event notifications to a user's mobile device, wherein map and calendar applications are polled with correlations made between map locations and event information and geo-fence boundaries are established for map locations which are inherited by their associated events. Penetration of a geo-fence boundary by a mobile device running the mobile application triggers a search for events that are associated with the established geo-fence boundary, and filtered notifications of event options of interest to the user are transmitted to the mobile device based on pre-established and dynamic variables and whether the user can arrive at the event while it is underway.

In another example, US 20100075652 A1 of Keskar et al discloses a method, an apparatus and a system for enabling context-aware notification in mobile devices, wherein mobile devices may utilize various sensors to gather context information pertaining to the user's surroundings. These devices may also include and/or access other types of information pertaining to the user, such as the user's calendar data as per US 20150237475 A1 above. In one embodiment, mobile devices may utilize some or all the gathered information to determine the appropriate behaviour of the mobile device, in conjunction with the user's preferences.

In a further example, U.S. Pat. No. 9,008,629 B1 assigned to Amazon Technologies, Inc. discloses mobile notifications based upon sensor data of a mobile device, wherein various embodiments are employed to generate device notifications based upon ambient conditions associated with a mobile device. To this end, a request to generate a device notification is obtained from a user application. Notification content is extracted from the request and an escalated or de-escalated notification level is applied that is based at least in part upon the ambient conditions of the mobile device and properties about the ambient conditions that can be identified.

In still another example, WO 9923579 A1 assigned to Microsoft Corp. discloses a system for maintaining a notification database in a mobile device. A notification scheduling program is run at a predetermined time and is configured to obtain information indicative of a plurality of notifications to be presented in the future. The notifications which are to be presented within a predetermined time period are entered in the notification database. The notification scheduling program is scheduled to run in response to expiration of the predetermined time period. An online publication entitled "Master notifications in Android Lollipop with Notification Priority and Downtime", ANDROID TIPBOT, 3 Dec. 2014 discloses custom settings provided by the Android OS which enable a mobile user to control whether or not they wish to be alerted by way of an audible tone or a vibration when a notification has been delivered to their mobile device. These alert preferences can be based on the time of day a notification is delivered to their mobile device and/or based on a priority assigned by the user to a type of notification (such as whether the notification is a call, message, event or a reminder). The custom settings also enable a user to prevent push notifications generated by a remote server and delivered to an app on their mobile device from being displayed on the mobile device. However, there is no disclosure in this document of an app located on the mobile device being able to itself locally generate notifications. Another online publication entitled "WhatsApp Message "Sent", "Delivered" and "Read" Status Identification using Indicators and Tick Marks", 31 Mar. 2015 by Jaber Al Nahian explains the meaning of different indicators displayed alongside a sent WhatsApp message. These indicators or notifications inform a WhatsApp user of the status of a message they have sent from the WhatsApp app on their mobile device. It is clear from this document that all these notifications are generated by the remote WhatsApp server for delivery to the WhatsApp app on the mobile device, rather than being generated locally by the mobile device.

However, and fundamentally, the above techniques are all predicated upon the active connectivity of the mobile device to a network for pushing the user notification thereto, positing the permanent and ubiquitous availability of network connectivity at any time as a given, without consideration to the timeliness of outputting one or more notifications to a user. Accordingly, it would be useful to provide an electronic user notification system, in which a mobile application is allowed to take ownership of the electronic notification generating process locally at a mobile device, rather than wherein one remote server, or a collection thereof when notification brokers or app analytics providers are involved, pushes the notifications remotely when instructed.

BRIEF SUMMARY OF THE INVENTION

The present invention mitigates shortcomings associated with the prior art of reference by providing a local electronic user notification solution apt to deliver an electronic user notification irrespective of the connectivity of the mobile device and the runtime status of the app to which it relates, at a time determined to be appropriate through contextual data, independently of the remote notification data server.

According to an aspect of the present invention therefore, there is provided a method for generating a local electronic user notification at a network-capable personal computing device about a data processing application stored in the device, the method comprising the steps of selecting at least one predetermined notification format; selecting at least one predetermined local trigger event; associating the or each selected predetermined notification format and the or each selected predetermined local trigger event with the data processing application at the device; loading and storing first notification data when the mobile device is connected to a network; and, irrespective of whether the mobile device is connected to a network, monitoring local hardware and data processing events at the device in real time; comparing monitored events against the or each selected predetermined local trigger; and, upon matching at least one selected predetermined local trigger event with at least one monitored event, formatting the stored first notification data according to a first selected predetermined notification format to generate the local electronic user notification at the device; and outputting the generated local electronic user notification to a user interface of the device independently of a runtime status of the data processing application.

The technical problem which the above method solves, is how to generate user notifications at a time determined to be appropriate to the user, independently of the network connectivity of the device and the runtime status of the app targeted by the notification. The problem is solved by generating the user notification locally in dependence upon triggers corresponding to parameters matching contextual data, comprised inter alia of hardware states, device data and user input data that is monitored locally in real-time or near real-time. It will be appreciated that in some cases it may be just delivered instantly; once received by the device (and the client has all the Notification Management features (update content, reporting interactions etc.)

In an embodiment of the method, the step of selecting at least one predetermined local trigger event preferably further comprises selecting a plurality of predetermined local trigger events; and the step of matching preferably further comprises matching some or all of the plurality of predetermined local trigger events with a respective plurality of monitored events. This embodiment advantageously introduces an element of redundancy in the parameters that are monitored in real-time, together with additional precision in the timing of generating and outputting user notification.

An embodiment of the method may comprise the further step of selecting at least one threshold parameter for the or each selected predetermined local trigger event. This embodiment advantageously provides for the fine adjustment of the triggering parameters, which enables still more discrete triggering conditions and, therefore, still more accurate a determination of the correct time at which to generate and output a user notification.

In an embodiment of the method, the step of formatting preferably further comprises formatting the stored first notification data according to a second selected predetermined notification format to generate a second local electronic user notification at the device, and outputting the generated second local electronic user notification to the user interface of the mobile device independently of the runtime status of the mobile application. This embodiment advantageously introduces an element of redundancy in the effectiveness of the notification process, by generating and outputting a second user notification if the outputting of a first user notification should fail, or if a first user notification requiring user input for acknowledgement or other purposes is not interacted with.

An embodiment of the method may comprise the further step of loading and storing second notification data when the mobile device is connected to a network, wherein, if the stored first notification data has not yet been formatted to generate the local electronic user notification or if the generated local electronic user notification based on the stored first notification data has not yet been output to the display, the step of formatting further comprises formatting the stored second notification data according to the first selected predetermined notification format to generate the local electronic user notification at the device. This embodiment advantageously reduces computational activity at the device, by replacing stored first notification data with the stored second notification data, either when generating a first user notification, or before outputting a first user notification generated with the stored first notification data, and moreover reduces notification data storage requirements at the device by deleting the redundant first notification data upon receiving the second notification data, with the further advantage of not inconveniencing the device user with generating and outputting two consecutive notifications, of which the first one is redundant. In one embodiment, for a user it may appear that part of the content just gets updated. A silent push notification, or a campaign sync can update the content for the first notification. In an embodiment the content of a message can be personalised, for example including a person's name using pattern matching and replacing content between a user.

An embodiment of the method may comprise the further step of prioritising selected predetermined notification formats according to selected predetermined local trigger events. This embodiment advantageously allows an app developer to preselect and assign a specific notification format to each of several combinations of user and/or device context-dependent triggers, in dependence upon the criticality of the meaning embodied by the notification data.

An embodiment of the method may comprise the further step of reporting a local electronic user notification display event to a remote server. This embodiment advantageously allows an app developer to receive reporting data about how users interact with notifications generated according to the method and facilitates subsequent actions, including updating the notification, expiring the notification, sending another notification from another campaign, sending a notification formatted according to another type (e.g. SMS or email) and removing the notification, managing notifications across multiple apps on one device, or across multiple apps installed across multiple devices for a same user.

Accordingly, an embodiment of the method may comprise the further step of associating the network-capable personal computing device with at least a second network-capable personal computing device, whereby the method is independently performed locally at each device. For any user with several data processing devices capable of peer association, typically through ad hoc or peer-to-peer networking and shared user identifying data, this embodiment advantageously reduces computational activity across the several devices, by generating a user notification at only one of the several associated devices and preventing the generation of another user notification for the same stored notification data at the remaining device(s), with the further advantage of not inconveniencing the device user with generating and outputting identical notifications, all but one of which are redundant.

In an alternative embodiment, the method may comprise the further step of deleting stored notification data corresponding to a first output notification at the or each associated device that, after the first generated local electronic user notification has been output at a first device. This embodiment variant advantageously reduces notification data storage requirements across the several associated devices, by deleting the redundant first notification data at the device(s) at which the user notification is prevented.

An embodiment of the method may comprise the further step of: prioritizing the generation of local electronic user notifications at the device according to selected parameters.

An embodiment of the method may further comprise generating local electronic user notifications about a plurality of data processing applications at the device, and prioritizing the generation of the local electronic user notifications across at least two of the plurality of data processing applications.

In one embodiment, the parameters are selected from the group comprising: device and user data, user selected preferences, past user behavior and aggregated past data.

According to another aspect of the present invention, there is also provided a method for generating a local electronic user notification at a network-capable personal computing device about a data processing application stored in the device, the method comprising the steps of selecting at least one predetermined notification format;
selecting at least one predetermined local trigger event;
associating the or each selected predetermined notification format and the or each selected predetermined local trigger event with the data processing application at the device;
loading and storing first notification data when the mobile device is connected to a network;
and, irrespective of whether the mobile device is connected to a network,
monitoring local hardware and data processing events at the device in real time;
comparing monitored events against the or each selected predetermined local trigger;
and, upon matching at least one selected predetermined local trigger event with at least one monitored event,
formatting the stored first notification data according to a first selected predetermined notification format into the local electronic user notification at the device; and
outputting the local electronic user notification to a user interface of the device independently of a runtime status of the data processing application.

According to another aspect of the present invention, there is also provided a system for generating a local electronic user notification at a network-capable personal computing device about a data processing application stored in the device, comprising a manager module adapted to select at least one predetermined notification format, to select at least one predetermined local trigger event and to associate the or each selected predetermined notification format and the or each selected predetermined local trigger event with the data processing application at the device; a synchronising module adapted to load and store first notification data when the mobile device is connected to a network; a monitoring module adapted to monitor local hardware and data processing events at the device in real time irrespective of whether the mobile device is connected to a network; and a notification engine adapted to compare monitored events against the or each selected predetermined local trigger and, upon matching at least one selected predetermined local trigger event with at least one monitored event, to format the stored first notification data according to a first selected predetermined notification format to generate the local electronic user notification at the device, and to output the generated local electronic user notification to a user interface of the device independently of a runtime status of the data processing application. According to another aspect of the present invention, there is also provided a system for generating a local electronic user notification at a network-capable personal computing device about a data processing application stored in the device, comprising a manager module adapted to select at least one predetermined notification format, to select at least one predetermined local trigger event and to associate the or each selected predetermined notification format and the or each selected predetermined local trigger event with the data processing application at the device; a synchronising module adapted to load and store first notification data when the mobile device is connected to a network; a monitoring module adapted to monitor local hardware and data processing events at the device in real time irrespective of whether the mobile device is connected to a network; and a notification engine adapted to compare monitored events against the or each selected predetermined local trigger and, upon matching at least one selected predetermined local trigger event with at least one monitored event, to format the stored first notification data according to a first selected predetermined notification format into the local electronic user notification at the device, and to output the local electronic user notification to a user interface of the device independently of a runtime status of the data processing application In an embodiment of the system, the manager module may be further adapted to select a plurality of predetermined local trigger events, and wherein the notification engine is further adapted to match some or all of the plurality of predetermined local trigger events with a respective plurality of monitored events.

In an embodiment of the system, the manager module may be further adapted to select at least one threshold parameter for the or each selected predetermined local trigger event.

In an embodiment of the system, the notification engine may be further adapted to format the stored first notification data according to a second selected predetermined notification format into a second local electronic user notification at the device, and to output the second local electronic user notification to the user interface of the mobile device independently of the runtime status of the mobile application.

In an embodiment of the system, the synchronising module may be further adapted to load and store second notification data when the mobile device is connected to a network and wherein, if the notification engine has not yet formatted stored first notification data into the local electronic user notification or output same to the display, the notification engine is further adapted to format the stored second notification data according to the first selected predetermined notification format into the local electronic user notification at the device.

In an embodiment of the system, the manager module may be further adapted to of prioritise selected predetermined notification formats according to selected predetermined local trigger events.

In an embodiment of the system, the manager module may be further adapted to report a local electronic user notification display event to a remote server.

In an embodiment of the system, each of the manager module, the synchronising module, the monitoring module and the notification engine at the device may be duplicated at a second network-capable personal computing device associated with the first device, whereby the system generates the local electronic user notification at each or either device.

In an alternative embodiment, the synchronising module of the first device may causes the synchronising module at the second or each associated device to delete stored notification data corresponding to the local electronic user notification, after the notification engine of the first device has output a local electronic user notification.

For any of the methods and the systems described herein, the notification data may comprise one or more data transfer objects (DTOs).

For any of the methods and the systems described herein, the or each notification format may be selected from the group comprising a mobile data processing application (app) notification, an interactive display message, an electronic mail communication and a short message service communication. It will be appreciated that the system and invention can be implemented using any type of message.

For any of the methods and the systems described herein, the or each predetermined notification trigger event may be selected from the group comprising time, location of the device, beacon, other data processing application(s) stored in the device, connectivity type and/or status of the device, recent call or short message service communication received at or sent by the device, power status of the device, brightness level of the device display, environmental conditions about the device, user device activity, roaming status or condition of the device, memory capacity of the device, identity of a mobile connectivity service provider for the device, device signalling condition and/or status, connection of headphones to the device, noise level about the device, proximity of the device to an external entity, physical orientation of the device, audio volume level of the device, locked or unlocked status of the device operating system, activation of an airplane mode of the device, language of the device operating system, type of the device, run command for the at least one data processing application, a time period elapsed since the run command, a time period elapsed since the at least one data processing application was first stored in the device, elapsed time from the generation of a previous notification by the data processing application, time since last interaction by a user with a notification by the data processing application.

According to yet another aspect of the present invention, there is also provided a user interface for use with embodiments of the system as described herein, wherein the user interface adapted to receive user input effecting a selection of the or each predetermined notification format and/or the or each predetermined local trigger event.

An embodiment of the user interface may be further adapted to receive user input effecting a selection of at least one threshold parameter for the or each selected predetermined local trigger event.

According to still another aspect of the present invention, there is also provided a computer program product, comprising a computer usable medium having a computer readable program code embodied therein, said computer readable program code adapted to be executed to implement a method as described herein, for generating a local electronic user notification at a network-capable personal computing device about a data processing application stored in the device.

In an embodiment there is provided a Machine Learning module. The machine learning module works by collecting wifi, mobile network cell information (Android only), GPS and charging data over the past 14 days (must be at least 7 days) to approximate when someone is most likely to be at home (e.g. home: during the night) (work: during the day), even if all data variables aren't all available. This happens locally on the device, by collecting sample data at different times of the day and night, and counting the number of times a user was at the location at the time the data is collected. When the device checks if a user is at home, the values collected are compared against the processed data to determine if a user is likely to be at home.

In an embodiment a first step in terms of machine learning triggers, where local data is processed or brought back to the core platform in many cases to work out likely outputs based on many layers inputs. Both iOS and Android are starting to support neural network algorithms and other AWL tools which we may be able to use in the future locally on the device. Other examples are:

Auto Trigger—use all the data for that user (and all users of that app, or all apps)
to deliver a notification to a user at the moment (machine learning defined combination of triggers) that has the greatest chance of being clicked on.

Boredom Trigger—use a machine learning defined combination triggers together
to work out the most likely time when someone is on the phone, idly surfing around.

In an embodiment there is provided a Clash Management Module. In a campaign manager, if two notifications, based on their triggers, are likely to be sent to a user at the same time, a warning to the administrator can be presented. This is server/campaign manager side only.

Other aspects of the present invention are as stated in the appended claims.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE INVENTION

Figure 1:
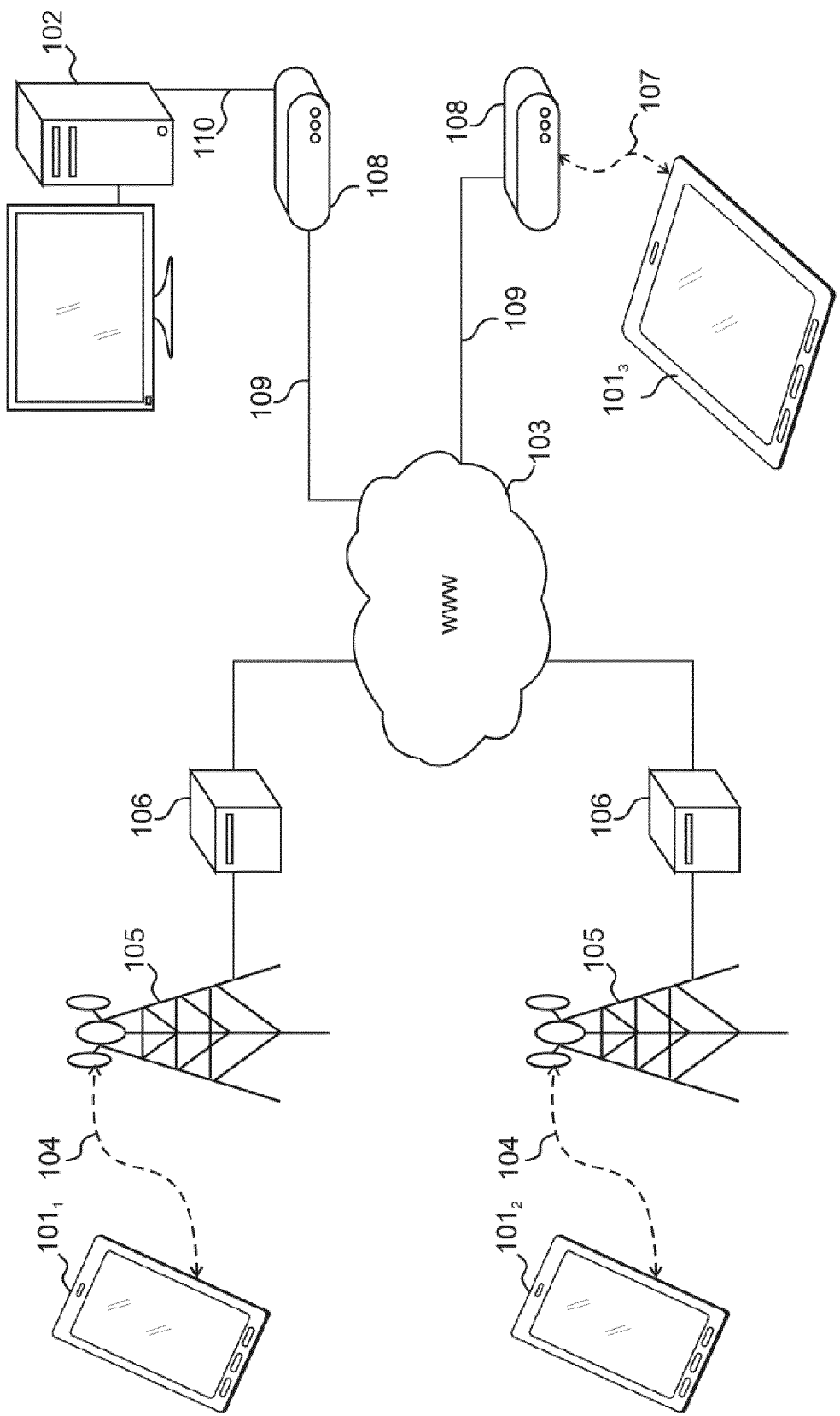
FIG. 1 is a logic representation of a network architecture according to a first embodiment of the present invention, including a wide area network, a mobile telephony network and a plurality of personal computing devices and a server connected thereto.

Referring now to the figures and initially FIG. 1, there is shown a network environment in which several data processing terminals $101_N$, 102 are connected to a Wide Area Network (WAN) 103, in the example the Internet. Network connectivity and interoperable networking protocols of each terminal allow the terminals to connect to one another and communicate data to and receive data from one another according to the methodology described herein.

Data processing terminal $101_1$ is a mobile personal communication device operated by a first user, such as an Apple® iPhone® or a Samsung® Galaxy® smartphone. Data processing terminal $101_2$ is a second mobile personal communication device operated by a second user, and data processing terminal $101_3$ is a mobile personal data processing device also operated by the second user. Each mobile personal communication device $101_{1,2}$ emits and receives data, including voice and/or alphanumerical data, encoded as a digital signal over a wireless data transmission 104, wherein the signal is relayed respectively to or from the device $101_{1,2}$ by the geographically-closest communication link relay 105 of a plurality thereof. The plurality of communication link relays $105_N$ allows digital signals to be routed between mobile devices $101_N$ and their intended recipient by means of a remote gateway 106. Gateway 106 is for instance a communication network switch, which couples digital signal traffic between wireless telecommunication networks, such as the network within which wireless data transmissions 104 take place, and the WAN 103. The gateway 106 further provides protocol conversion if required, for instance if the device 101 uses a Wireless Application Protocol ('WAP') or Secure Hypertext Transfer Protocol ('HTTPS') to communicate data.

The mobile personal data processing device $101_3$ may be a tablet computing device such an Apple® iPad® or a wearable computing device such as an Apple® Watch®. The mobile personal data processing device $101_3$ emits and receives data encoded as a digital signal over a wireless data transmission 107 conforming to the IEEE 802.11 ('Wi-Fi') standard, wherein the signal is relayed respectively to or from the device $101_3$ by a local router device 108 which is itself connected to the WAN 103 via a conventional ADSL or optical fibre connection over a wired telecommunication network 109, through which the local router device 108 interfaces the device $101_3$ to the WAN communication network 103. The personal data processing device $101_3$ further comprises a High Frequency Radio Frequency Identification (RFID) networking interface implementing Near Field Communication (NFC) interoperability and a Bluetooth® networking interface implementing short-range Wireless Local Area Network connectivity, together with data communication protocols for facilitating wireless data communication over a short distance with correspondingly-equipped devices such as the second user's smartphone $101_2$.

The data processing terminal 102 is a server operated by a mobile software application (app) developer and is a personal computer device which emits and receives data encoded as a digital signal over a wired data transmission 109, wherein said signal is relayed respectively to or from the computer 102 by a local router device 108 implementing a wired local network 110 operating according to the IEEE 802.3-2008 Gigabit Ethernet transmission protocol and/or again a high-bandwidth wireless local network operating according to the IEEE 802.11 Wi-Fi wireless transmission protocol. The router 108 is itself connected to the WAN 103 via a conventional ADSL or optical fibre connection over a wired telecommunication network 109, through which the local router device 108 interfaces the computer 102 to the WAN communication network 103.

Figure 2:
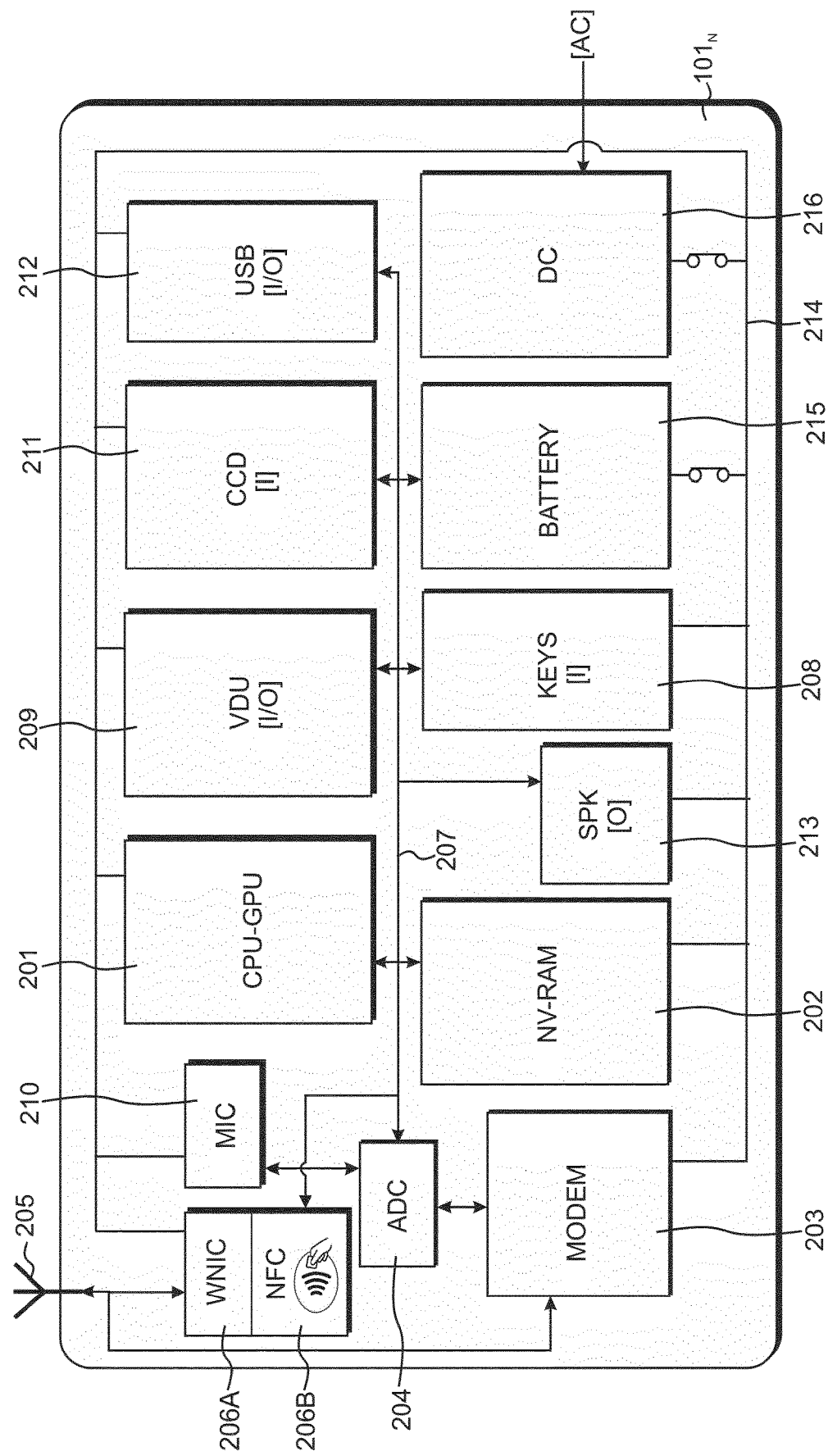
FIG. 2 illustrates a typical hardware structure of a data processing device shown in FIG. 1, such as the personal computing devices and the server, including processing means, memory means, networking means and display means.

A typical hardware architecture of any of the personal computing devices $101_N$ is shown in FIG. 2 in further detail, by way of non-limitative example. As skilled persons will readily understand, the hardware architecture of either of the smartphones $101_{1,2}$ is substantially similar to that of the tablet or smartwatch device $101_3$, suitably scaled for purposes of ergonomic handling and miniaturisation. Skilled persons will also readily understand that a hardware architecture of the server 102 is also substantially similar to that of the personal computing devices $101_N$, albeit with components designed for durability and redundancy of operation, by contrast with the components of the personal computing devices $101_N$ designed for improved portability, in all instances including least a processor, memory means, networking means and display means.

The typical personal device $101_N$ thus firstly includes a data processing unit 201, for instance a general-purpose microprocessor, for instance conforming to the Cortex® architecture manufactured by ARM®, acting as the main controller of the data processing terminal $101_N$ and which is coupled with memory means 202, comprising volatile random-access memory (RAM), non-volatile random-access memory (NVRAM) or a combination thereof.

The personal device $101_N$ further includes networking means. Communication functionality in the personal device $101_N$ is provided by a modem 203, which provides the interface to external communication systems, such as the GPRS, 3G or 4G cellular telephone network $105_N$, 106 shown in FIG. 1, associated with or containing an analogue-to-digital converter 204, which receives an analogue waveform signal through an aerial 205 from the communication link relay 105 and processes same into digital data with the data processing unit 201 or a dedicated signal processing unit. Alternative wireless communication functionality is provided by a wireless network interface card (WNIC) 206A interfacing the personal device $101_N$ with a wireless local area network 107 generated by a local wireless router 108. Further alternative wireless communication functionality is provided by a High Frequency Radio Frequency Identification (RFID) networking interface 206B implementing Near Field Communication (NFC) interoperability and data communication protocols for facilitating wireless data communication over a short distance with correspondingly-equipped devices such as the smartwatch $101_3$ of the second user.

The CPU 201, NVRAM 202 and networking means 203 to 206B are connected by a data input/output bus 207, over which they communicate and to which further components of the personal device $101_N$ are similarly connected in order to provide wireless communication functionality and receive user interrupts, inputs and configuration data.

Accordingly, user input may be received from a data input interface 208, which for the personal device $101_N$ is a keypad with a limited number of multi-functional keys and/or a capacitive or resistive touch screen feature of the display unit 209. Further input data may be received as analogue sound wave data by a microphone 210, digital image data by a digital camera lens 211 and digital data via a Universal Serial Bus (USB) 212. Processed data is output as one or both of display data output to the display unit 209 and audio data output to a speaker unit 213. Power is supplied to the above components by the electrical circuit 214 of devices 101, 102, which is interfaced with an internal battery module 215, which itself may be recharged on an ad hoc basis by an electrical converter 216.

Figure 3:
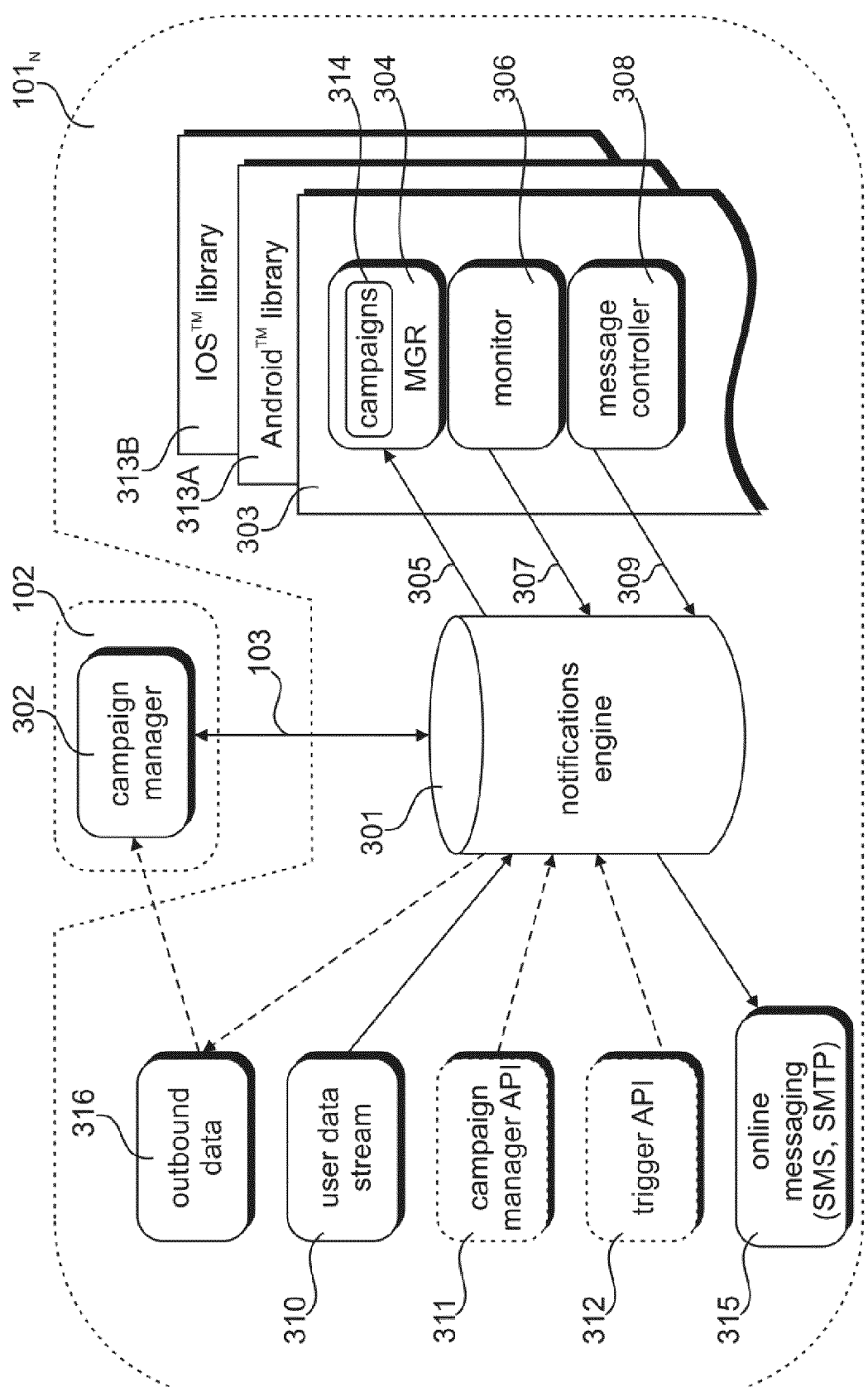
FIG. 3 provides a functional representation of an embodiment of the present invention in the form of logic blocs implementing respective steps of the method described herein, including a notifications engine and a campaign manager.
Figure 4A:
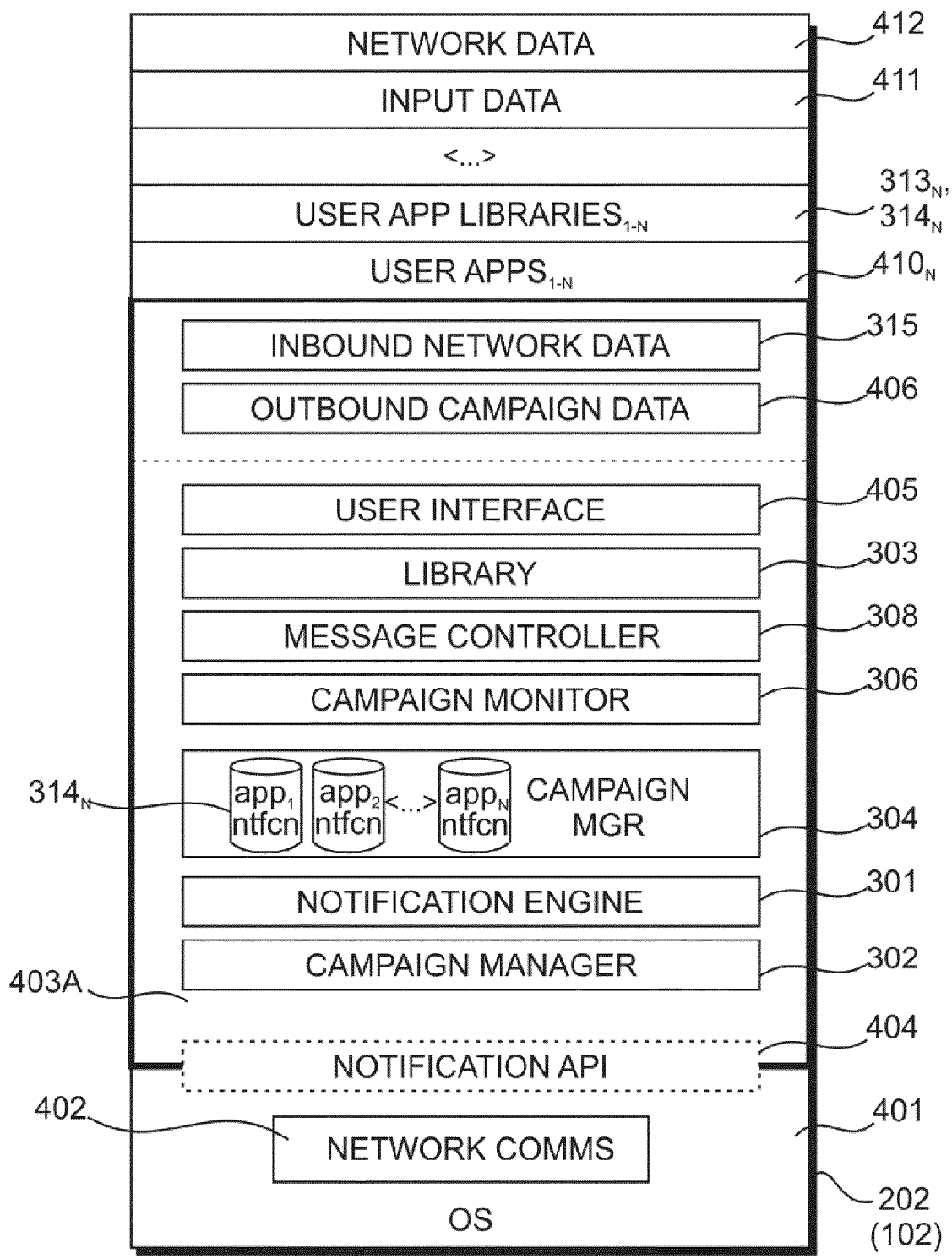
FIG. 4A illustrates the memory contents of the server of FIG. 1 at runtime, including an operating system, a set of instructions and discrete data modules thereof embodying the logic blocs of FIG. 3.
Figure 4B:
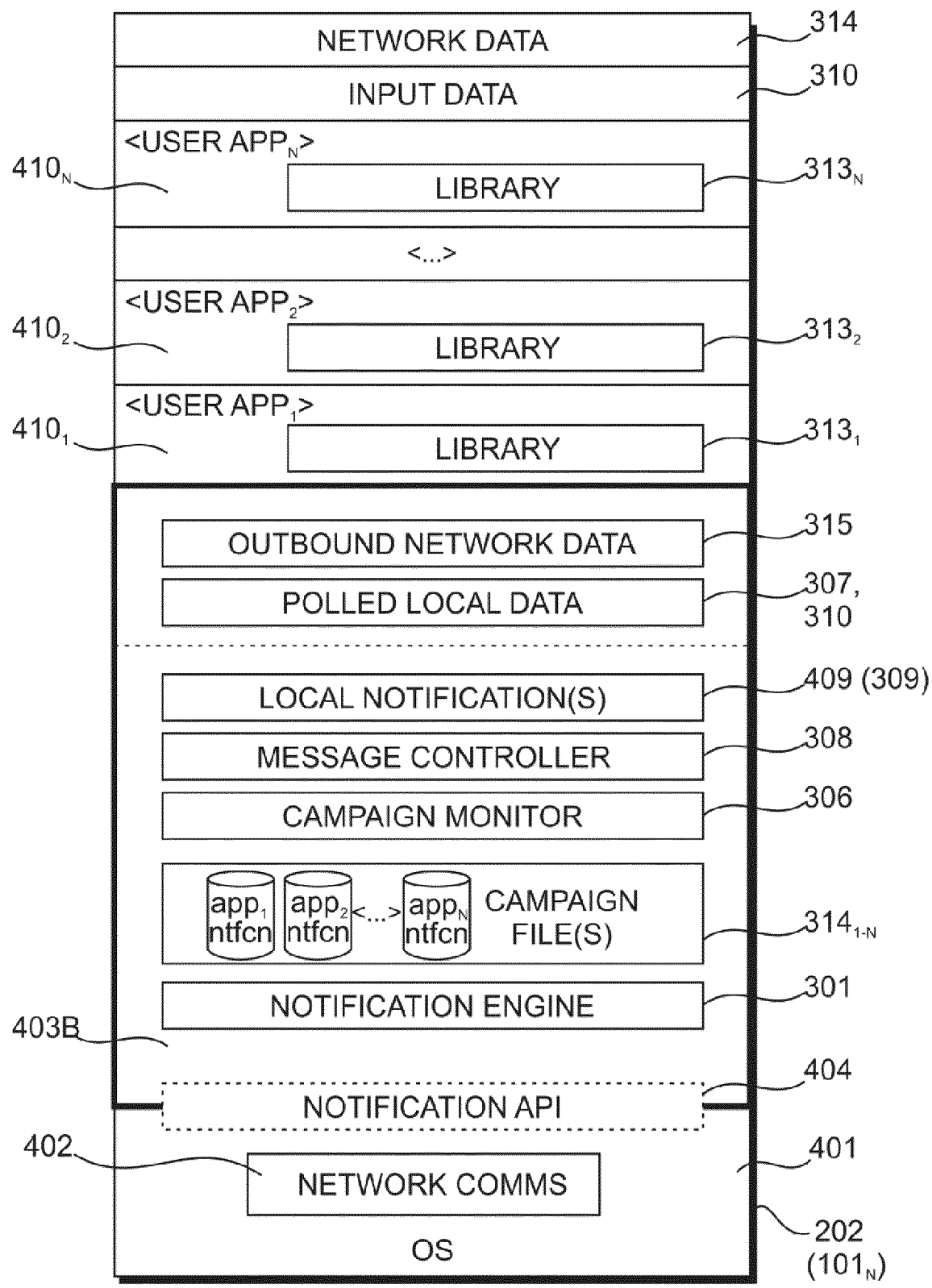
FIG. 4B illustrates the memory contents of a personal computing device at runtime, including an operating system, a set of instructions and discrete data modules thereof embodying certain of the logic blocs of FIG. 3, and a plurality of device applications.

With reference to FIGS. 3, 4A and 4B now, a functional representation of an embodiment of the notification generating method performed in the environment of FIGS. 1 and 2 is shown in the form of logic blocs in FIG. 3, which are capable of embodiment as respective data processing applications at the server 102 and each user device $101_N$, shown loaded and at runtime in the context of the memory 202 of the server 102 in FIG. 4A and of a device $101_N$ in FIG. 4B, wherein the data processing applications configure each device $101_N$ and the server 102 as a system in the environment of FIG. 1.

With reference to FIGS. 3 to 4B therefore, wherein like reference numerals designate like components and features, an operating system (OS) is shown at 401 which, if the server 102 is a desktop computing device as described in FIG. 1 and manufactured e.g. by DELL® Inc. of Round Rock, Tex., USA, is Windows Server 2012 R2 distributed by Microsoft® Inc. of Redmond, Wash., USA. The OS 401 includes instructions for governing the basic data processing, interdependence and interoperability of the server hardware components, and communication subroutines 402 configure the server 102 for bilateral network communication via a NIC interfaced with the wired connection 109 to the local router 108. The OS 301 also includes input subroutines for reading and processing input data variously consisting of user direct input to human interface devices, namely a keyboard and a computer mouse.

Likewise, each device $101_N$ includes an OS 401 which, if the device $101_{1-3}$ is for instance an iPhone® mobile phone handset or an iPad® tablet computer manufactured by Apple® Inc. of Sunnyvale, USA, is iOS® likewise distributed by Apple® Inc. or, if the device $101_{1-3}$ is for instance an Galaxy® mobile phone handset manufactured by Samsung® Electronics Co., Ltd of Suwon, Republic of Korea, is Android® distributed by Google® Inc. Each OS 401 includes communication subroutines 402 to configure the data processing terminal $101_N$ for bilateral network communication via the modem 203 and both the NIC 206A and the NFC module 206B. The OS 401 also includes input subroutines for reading and processing input data variously consisting of user direct input to the keypad 208 and to the touch screen interface 209, image data captured by the CCD 211 and audio data supplied by the DAC 204 after processing input from the microphone 210.

The data processing application 403A embodies a campaign platform at the server 102, suitable for the developer of third-party app(s) $410_N$ to generate and update app-related campaigns 404 in a user interface 405, communicate the generated campaign data 406 to remote user devices $101_N$ at which the or each third-party app 410 is installed. and eventually receive notification-caused user data 315 according to principles described herein.

The data processing application 403B embodies a notification platform with a local engine 301 that runs locally in each device $101_N$ within any third-party iOS® or Android® data processing app $410_N$ developed at the server 102 and distributed therefrom, or through the additional intermediary of a further server (not shown) configured as an iOS® or Android® app repository, of which the Apple Store® and Google Play® are respective examples, wherein the data processing application 403B compares real-time device hardware data and other data against a plurality of contextual triggers, to automatically generate user app notifications 409 at a time determined to be optimal in dependence on the matching of contextual trigger(s), regardless of whether the third-party app is loaded in memory 202 and running or not.

The set of instructions 403B is interfaced with the OS 401 through one or more Application Programmer Interfaces (API) 404 and comprises and coordinates the data processing activity of function-specific data processing subroutines corresponding to functions of the logic blocs described herein. The campaign notifications API 404 is based upon a representational state transfer (REST) API provided with entry point URLs and the JavaScript Object Notation (JSON) format, wherein JSON data fields are representative of the functionality required by each of the functional blocs described herein. It will be appreciated other formats can be used such as XML.

Accordingly a first logic bloc is the Notifications Engine (NE) 301, which is the platform core and coordinates all data processing and inter-module data exchanges of the platform, as well as all data transfers and communications with each third party app. The NE 301 may be virtualised in part or whole, for instance by being hosted on Microsoft's Azure® cloud computing architecture, since this complies with a broad set of international and industry-specific compliance standards, such as ISO 27001, HIPAA, FedRAMP, SOC 1 and SOC 2, PCI DSS Level 1 as well as country-specific standards including Australia CCSL, UK G-Cloud, and Singapore MTCS.

The architecture and all communications and data transfers between the NE 301 and each instance of a library 303, wherein each third-party app generates its own instance 313A (for Android®-powered devices), 313B (for iOS®-powered devices) of the library 303 when it is first installed on a device $101_N$, uses proprietary data transfer object technology (DTOs). Each endpoint (NE 301 or each device) puts the data to blob storage and uses worker roles to collect and process the data being passed between them, advantageously allowing the method and system of the invention to scale unlimitedly, even for apps with hundreds of millions of discrete installations. All data transfers between the NE 301 and each third-party app uses HTTPS/SSL and URL signing for purposes of data securing, and the data transferred can also be encrypted if required.

A second logic bloc is the Campaign Manager (CM) 302, stored and processed at the server 102 and which enables the third-party app developer at the server 102 to create, edit and manage campaigns 314, as well as user accounts with multiple levels of role & responsibility settings. The CM 302 supports multiple third-party apps and OS types (313A, 313B) and the creation of many campaigns 314 for some or all of the different third-party apps in which the library 303 is installed in. For each mobile app $410_N$ the server 102 makes available, depending on the OS build of the app, a respective library (Android 313A and/or iOS 313B) is built and customized based on requirements of that deployment, including a permission matrix setup (user permissions which the third-party app requests from a user, and any additional user permissions required in-app for required notification triggers), custom app triggers (app data local to the user device $101_N$ that can be used as triggers or inputs in the CM 302 at the server 102, including any unique customer identifiers, reference numbers or customer mobile phone number for SMS messages) and custom backend triggers (any customer data feed 310 that will be passed to the NE 301 and then synchronised). In the above, and throughout the present specification, a campaign 314 is defined as a set of notification settings, notification format types, notification data and triggers, and can be relevant and synchronised to every instance of a third-party app $410_N$ installed at a device $101_{1-3}$, or only to one or more users who have that third-party app installed at their respective device $101_{1-3}$. A specific user campaign 314 must include a unique reference or customer number, which the NE 301 can link back to a specific installation instance of a third-party app $410_N$.

The CM 302 at the server 102 provides two core functional domains, relating respectively to third-party app settings and campaign management. With reference to third-party app settings first, each third-party app $410_N$ has global settings that can be changed by the CM 302 on the fly. The global settings firstly include campaign monitoring options to configure how often the campaign triggers are checked, and which can be schedule-driven according to a time interval or event-driven, for instance in response to a call, receipt of an SMS, unlocking of the device $101_N$ by the user, and more. The global settings next include data polling options to configure the gathering of trigger data each time the campaign monitor 306 checks the triggers. The global settings next include global messaging limits across all campaigns 314 over rolling periods at various intervals, for instance daily, weekly, monthly and annually. The global settings next include campaign synchronizing options, configuring the periodicity according to which new or edited campaigns 314 are synchronized to each third-party app $410_N$. The global settings last include miscellaneous app settings options such as OS version control, OS notification logo updates, badge counters, control group size, other third-party apps' triggers and deep link shortcuts.

With reference to campaign management next, the CM 302 creates and edits campaigns 314 and, in a user interface at the server 102, facilitates their viewing, particularly for the selection and configuration of triggers. For the creation of a campaign 314, a name, start date and optionally an end date are input by the app developer for a new campaign $314_N$, together with data identifying the third-party app $410_N$ to which the campaign $314_N$ applies. The developer next declares whether the campaign $314_N$ excludes the control group of users or not, and the size of the control group, as a percentage of all users of that app $410_N$, is defined at the app settings level.

The app developer at the server 102 then selects the notification format type and inputs the notification data as its content. The CM 302 automatically swaps and tracks all Uniform Resource Locator ('URL') address(es) and link(s) for dashboard tracking and reporting, including app deep links. The app developer at the server 102 then selects contextual triggers, or trigger events, for causing the generation of the notification 409 at each user device $101_N$. remotely from the server 102, wherein one or more triggers can be added together within anyone campaign 314 and each selected trigger contains a wide variety of relevant settings which can be configured or edited for each trigger.

Examples of trigger events corresponding to device hardware and data processing events at each user device $101_N$ variously include the following, all of which are device-determined in real-time or near real time:

time (actual device time, with options such as whether a unique trigger, or a recurring trigger with a developer-defined periodicity, whether a permanently valid trigger or limited to a predefined length of time);

elapsed time from the generation of a previous notification by the app;

time since last interaction by a user with a notification by the app;

location (based on proximity of a map location, and/or user home or user workplace calculated from parameters including time, device charging patterns and more etc. and/or country);

beacons (based on proximity of beacon UDIDs);

other installed apps (device-determined in real-time, according to whether one or more other third-party apps is installed or not);

connectivity and type (based on data connection type and/or status, whether WI-FI, Bluetooth or cellular, SSID, GPS status);

recent call and/or SMS (including call and/or SMS, incoming and/or outgoing, any or from a particular country or a specific number);

power (device battery level and charging status);
weather (temperature and humidity levels, if sensor data available on device 101);
user activity (still, walking, running, cycling, in a vehicle, if sensor data available on device 101);
roaming status; aeroplane mode status; brightness level of display 209;
status of memory 202 (with options for device storage levels and amount of free space);
network provider (with options to specify specific network provider(s) that a user is contracted with or not);
signalling quality (based on speed (2G, 3G, 4G) and strength);
headphones (whether connected or not);
ambient noise (based on microphone 210 and ADC 204);
device user proximity (based on CCD 211 determining degree of ambient obscurity relative to device time for distinguishing device location in garment pocket or bag relative to night time);
device orientation (portrait or landscape, if sensor data available on device 101);
audio volume (based on OS settings for device ringer and media playing);
locking status (based on whether device is user-secured or not);
device locale (based on OS settings for region/country and for language);
device type (with options for manufacturer, model, screen size, etc.);
delay (notification output deferral after triggering event);
call/SMS (notification generated when an SMS is received, or immediately after a call has ended);
third-party app $410_N$ open (notification generated only if the third-app $410_N$ is running and output to the display 209);
idle last open (generation if the third-party app $410_N$ has not been started for a predefined time period);
install time since (generation a predefined time period after the third-party app $410_N$ has been installed);
backend (based on device user-consented data feed received from server 102 or other backend platform);
notification centre (based on current status of the OS notification centre).

Parameters and, optionally, parameter thresholds can be provided and selected in the CM 302 for one or more of the above contextual trigger events, as flags and/or qualitative or quantitative values in dependence on the nature of a trigger event. For example, certain triggers may have negative options (e.g. 'not driving' for 'user activity'), or the validity of one or more matched trigger events may be time-limited. Once a campaign 314 is created (as a new campaign) or updated (as a pre-existing and stored campaign), it is saved on the CM 302 at the server 102. For the Android library 313A, it is updated based on the campaign synchronizing options, described herein. For the iOS library 313B, the saved campaign is pushed out by the server 102 to each device $101_N$ at which the third-party app $410_N$ is installed, either in real-time or as per the campaign synchronizing options.

Further logic blocs reside in the library 303 within a third-party app, including the Campaign Storing & Synchronising Manager (CSSM) 304, the Campaign Monitoring Manager (CMM) 306 and a Message Controller (MC) 308. The CSSM 304 is where each of the active campaigns 314 are stored, ready to be triggered. The CSSM 304 loads (305) new or edited campaigns 314 from the NE 301 according to the campaign synchronizing options set in the CM 302. The CSSM 304 is automatically cleared when a campaign 314 is no longer relevant. Customizable limits can be set for notification format types including data notification as local content, for instance an Interactive Display Message (IDM) with an embedded video file. The two types of campaigns which are both synchronised to each library 313A, 313B from the NE 301 are global campaigns (ready and waiting on all third party apps $410_{1-N}$) and user-specific campaigns (ready and waiting for just an identified user).

The CMM 306 implements data polling tasks and thus actively checks the device and other relevant data to determine whether the trigger events, including parameters and optionally thresholds of same, for each campaign 314 has been matched. The CMM 306 checks according to a frequency based on schedule or events as currently configured in the CM 302, independently for each distinct third-party app $410_N$. If the third-party app $410_N$ is configured to enable data polling in the Cm 302, the results of all triggers are stored each time they are checked, and all of this data is polled back to (307), and stored at the NE 301, where it is made available for reporting as an outbound data feed 316. This outbound data feed 316 can be configured to pass back information data to remote Cloud marketing hubs, central repositories and more to facilitate analysis, for instance wherein sent notification content and details stored in Adobe® Marketing Cloud™ on a per user basis. All data transferred back to the NE 301 during data polling is compressed before transferring, to reduce data bandwidth and storage usage.

After the CMM 306 checks the triggers and data and upon matching the triggering criteria, the MC 308 sends (309) the appropriate notification format (mobile notification, Interactive Display Message (IDM), SMS or email) and notification data (message content) as stored in the CM 302. The results from any notification 409 delivered by the MC 308 through the NE 301 as part of a campaign, e.g. indicative of whether the notification was dismissed, whether user input was received in respect of it, or whether it was delivered or not, are polled back (310). Online notification types 315, being notification types which cannot be sent locally by the third-party app $410_N$ to the device OS, are sent back to the NE 301 for onward delivery (e.g. SMS or email). Notifications 409 generated by the NE 301 are sent as any of mobile notifications, SMS, Interactive Display Messages (formatted according to HTML5 standard and including any of video, image, text, etc.) or email. Notifications 409 are managed by the NE 301 across all distinctly-installed third-party app $410_N$ in real time, as the Campaign Manager 302 pushes each relevant campaign 314, as a respective set of triggers and notification data, out to each device $101_{1-3}$ where the local NE 301 then works offline seamlessly, with full delivery & engagement tracking for each notification 409. Accordingly the NE 301 is preferably integrated with a number of leading SMS and email gateways, being the same communication providers which a user or third-party app $410_N$ already use for addressing and routing of conventional messages. However, for devices $101_N$ powered by Android®, a type of SMS (offline SMS) can be delivered directly to the SMS inbox by the library 313A locally on the device $101_N$, at no external bandwidth cost. To the user of the device, such a notification 409 appears identical to a conventional, carrier-delivered SMS.

Adverting to the building and customising of third-party app libraries (Android 313A and/or iOS 313B), particularly custom app triggers and custom backend triggers, the developer's backend platform at the server 102 can provide a customer data feed 310, which automatically creates campaigns 314, that are controlled, managed and reported on from the CM 302 under custom backend triggers. Accordingly the NE 301 sends created campaigns out to each corresponding installed third-party app 410 using the synchronisation function provided by the CSSM 304, wherein such campaigns 314 can again be at a global or user-specific level. This aspect is considered best implemented as a batch/bulk upload (PUT) using JSON or XML formats.

A next and optional logic bloc is a Campaign Manager API 311, which mirrors the functionality of the CM 302 but is made available through an API which any third-party app 410 can integrate directly into their backend platform. A further optional logic bloc is a Trigger API 312, through which campaign custom trigger events and data provided by a third-party app 410 are sent as direct inputs locally into the third-party app library $313_{A,B}$.

With reference to FIGS. 4A and 4B, further local data 411 and network data 412 may be stored in the memory means 202 of the server 102 and each device $101_N$ at runtime, some or all of which may be processed, respectively, either by the server notification application 403A or the device notification application 403B and sub-routines 301-312 thereof, or by or for other third-party application(s) $410_N$ being processed in parallel with the said notification applications. An example of further local data is for instance local user input 310 read by the OS 301 in real time from input devices 208, 209. An example of further network data 412 is for instance new campaign data or updating notification data 314 being received from the server 102 over the WAN 103.

Figure 5:
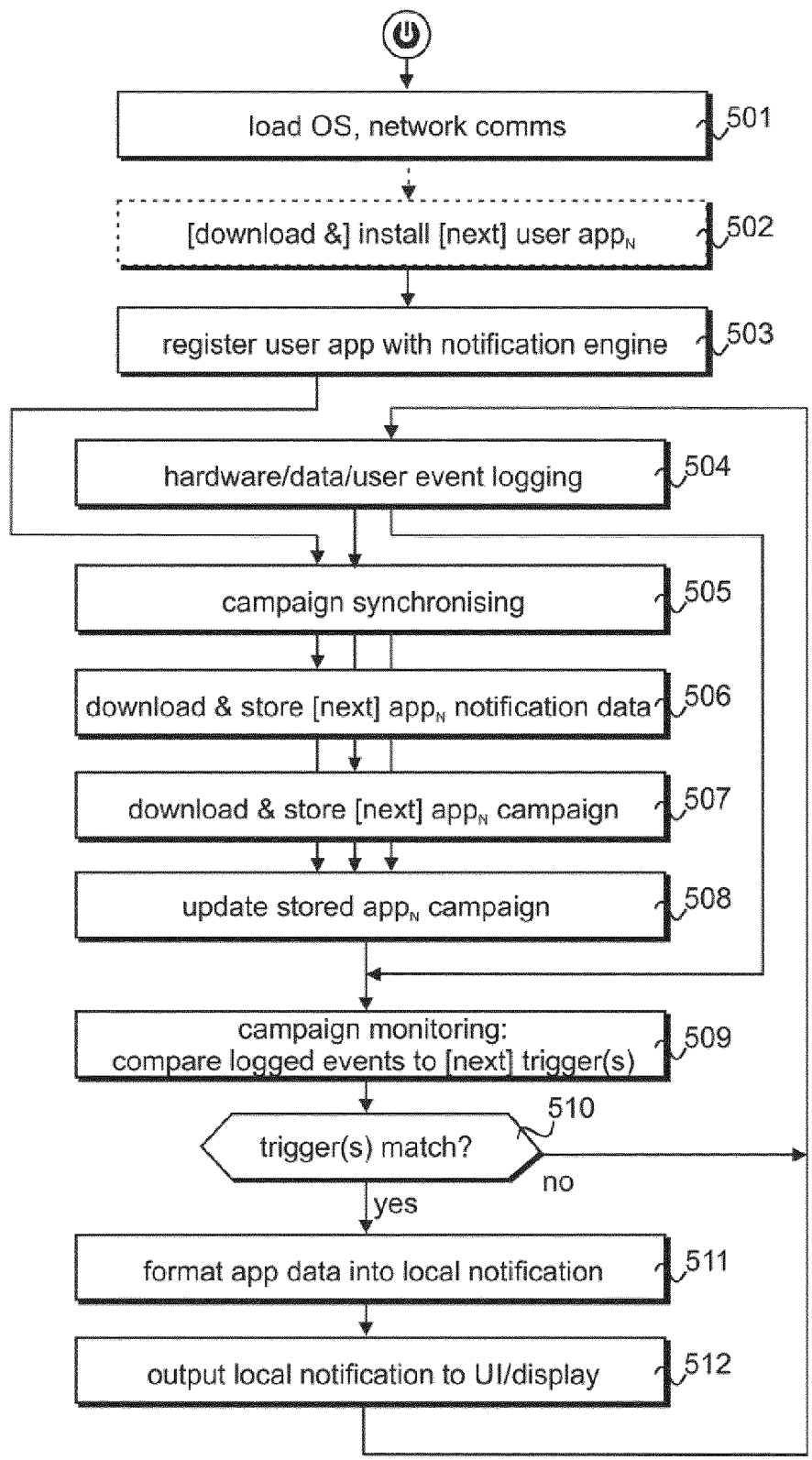
FIG. 5 details data processing steps performed by the set of instructions and discrete data modules of FIG. 4.

Data processing steps of the methodology implemented at each device by the notification application 403B for generating notifications locally at runtime are described hereafter with reference to FIG. 5, as discrete groups of chronological data processing tasks processed within a same processing cycle, and each such succession is repeated iteratively at runtime. It will be readily understood by the skilled person that such steps may be optimised and, where appropriate, processed substantially in parallel, as the architecture of the CPU 201, and the basic instructions set and libraries for same allows.

After powering up the device 101 conventionally, the OS 401 is loaded into the device memory 202 and started locally at step 501, including the OS communications subroutines 402 and the OS user interface is eventually instantiated on the display 209. In the example, the OS 401 is Android®, whereby library references are to library 313A. At step 502, the user installs a new third-party app 410, either downloaded from the server 102 or a third-party app repository, or loaded locally from external storage. At step 503, the library 313A of the newly-installed third-party app 410 registers with the notification application 403B through the notification API 404 and the notification engine 301 thereof, and control proceeds directly to step 505. At step 504, independently of steps 502, 503, the monitoring module 306 monitors the device's hardware states, OS and settings data and user data, all generally referred to as a contextual data and logs same. Control again proceeds directly to step 505, but also to step 509 described hereafter. At step 505, the notifications engine 301 synchronises campaigns $314_N$ stored at the device 101, if the device's network connectivity status permits. The notifications engine 301 therefore downloads and stores any new or updating notification data at step 506, then any new or updating campaign at step 507, from the campaign manager 302 at the server 102 and overwrites and/or deletes stored campaign and notification data made redundant by an update at step 508.

Further to steps 504 or 508, or in parallel to same as a concurrent data processing thread in a parallel application architecture, at step 509 the monitoring module 306 compares the logged contextual data of step 504 against stored the campaign trigger events 314 whereby a question is asked at step 510, as to whether the comparison has yielded a match. Adverting to principles described herein, a match may occur for a single trigger event or for a group thereof, in all cases as predetermined and set via the campaign manager 302. For example, the app notification campaign 314 for a third-party app 410 may set a single trigger event as proximity to a beacon UDID or, as a more discrete notification condition, combine the trigger event of proximity to a beacon UDID with a 'power' trigger event having a 'battery level' parameter with a threshold of 25%.

If the question of step 510 is answered negatively, control returns to the data monitoring and logging of step 504 and, adverting to the above logic, any further third-party app being installed at step 502 triggers step 503, and any new or updated campaign and/or notification data is updated per steps 505 to 508 in dependence on the device's connectivity. Alternatively, if the question of step 510 is answered positively, then a notification is triggered and must be generated whereby, at step 511, the notification engine 301 formats the third-party app notification data into a local notification 409 according to the notification format type in dependence on the third-party app campaign 314 and, at step 512, the notification engine 301 outputs the local notification 409 to the OS 401 for output to the device display 209. Control returns to step 504 thereafter for contextual data monitoring.

Figure 6:
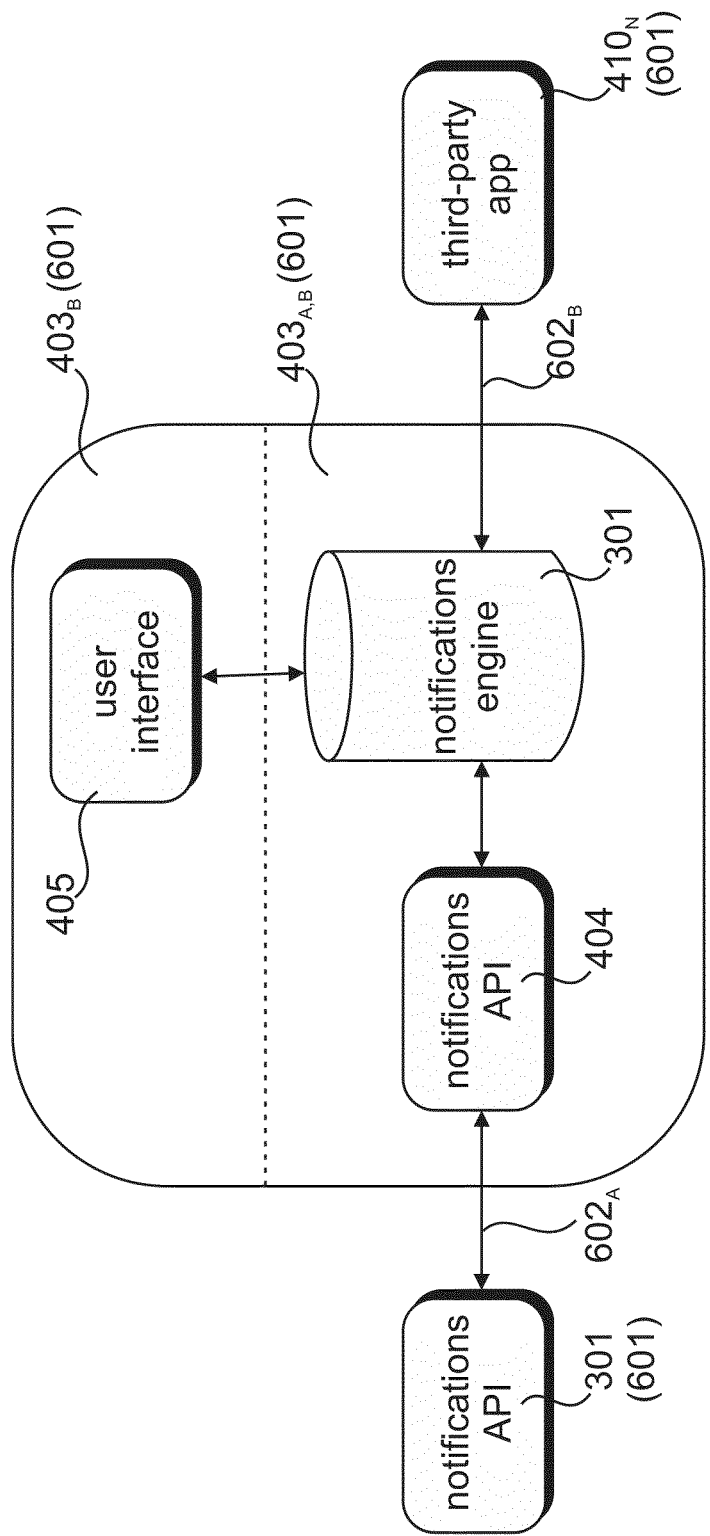
FIG. 6 provides a functional representation of data in transit between the functional blocs of FIG. 3 and the securitisation of same.

With reference to FIG. 6 now, the present invention considers the securitisation of notification data, and any specific user data component thereof, and user input data 310 in reply to a notification 409, in transit between modules and network locations 102, $101_N$. The data journey between network locations and application domains needs to be mapped and to include classification of any Personally identifiable information data, such as a common user identifier, mobile handset number, email address or the like. Data is considered at rest (601) at each of the remote developer server 102, within the processing domain of the notification applications $403_{A,B}$ and within the processing domain of the mobile user application $410_N$ concerned by a user notification 409. Data is considered in transit (602) between the remote developer server 102 and the processing domain of the notification application 403B ($602_A$), and between the processing domain of the application notification 403B and the processing domain of the mobile user application $410_N$ ($602_B$) concerned by a user notification 409. First in-transit data $602_A$ is received from and sent to the remote developer server 102 by the notification API 404, second in-transit data $602_B$ is received from and sent to the mobile user application $410_N$ by the notification engine 301. Within the notification application 403B, data-at-rest (601) is exchanged between the notification API 404 and the notification engine 301. Within the server-side notification application 403A at the server 102, data-at-rest (601) is also exchanged between the notification engine 301 and the user interface 405.

The Security of in-transit data 602 between the NE 301 and a third-party app $410_N$ is applicable to the transfer of campaign file data 406 from the server application 403A and each installation of a third-party app $410_N$ on a user device $101_N$; the transfer of polling data 307 from each installation of a third-party app $410_N$ on a user device $101_N$ to the user application 403B. Security measures may variously include the use of signed URLs, Personal Identification Number (PIN)-dependent HTTPS/SSL with encryption complying to 256-bit AES/Diffie-Hellmen ECDH Key Exchange.

Figure 7:
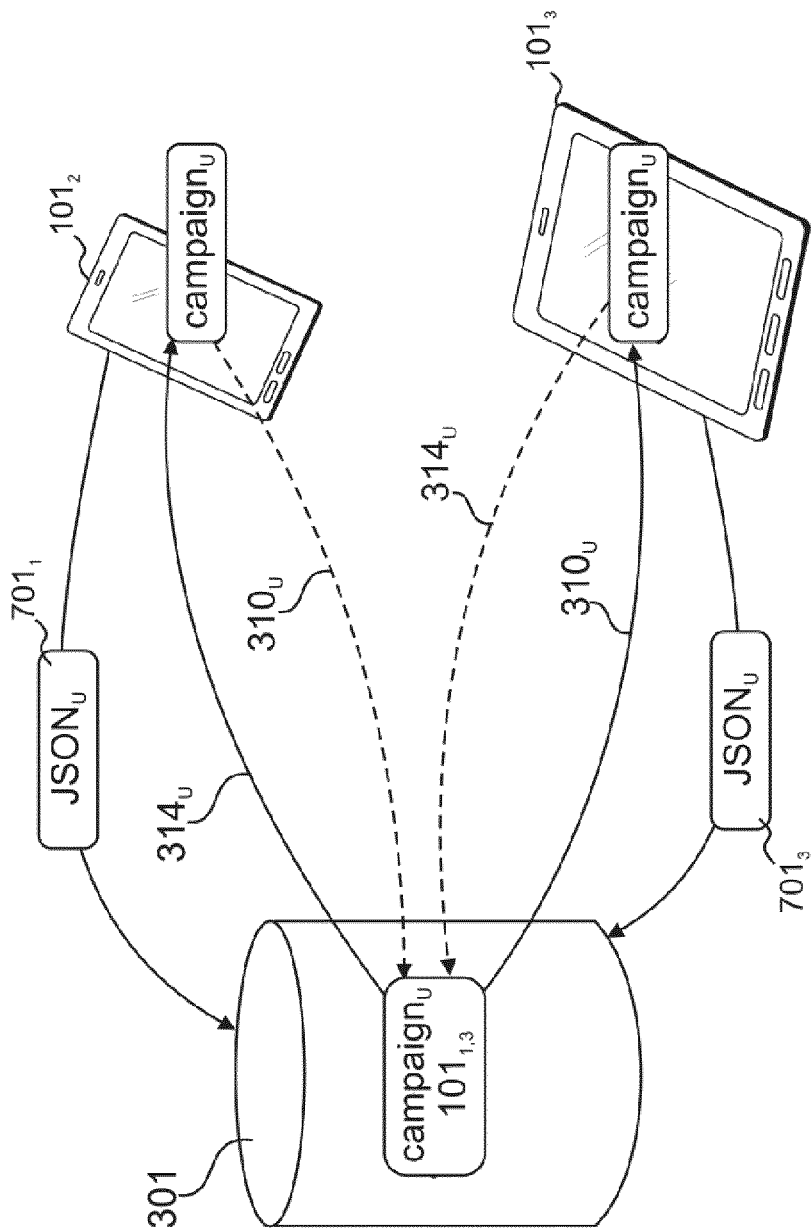
FIG. 7 provides a functional representation of an alternative embodiment of the present invention implementing respective steps of a method adapted to personal computing devices shown in FIG. 1 that are associated with one another through a shared user.

In an alternative embodiment of the method and system described with reference to FIGS. 1 to 6, now shown described with reference to FIGS. 7 and 8, the notification applications $403_{A,B}$ are implemented both to record the association of several user devices $101_{1,3}$ registered for use by a same user, and/or the association of several third-party apps $410_{1-N}$ installed at a same user device $101_1$, and to synchronise notifications 409 across the several associated user devices $101_{1,3}$ and/or the several third-party apps $410_{1-N}$.

The association and app/data synchronization of several user devices $101_{1,3}$ registered for use by a same user is well-known to skilled persons, and typically implemented through common user identifier or login details distributed to the several devices, whereby a user, after previously inputting login details to unlock one device $101_1$, interacting therewith, ceasing the said interaction, then inputting login details to unlock another device $101_3$ sharing the same OS 401 as the earlier device $101_1$, is presented with substantially the same third party apps $410_N$ updated with the previous interaction data at the earlier device $101_1$.

Accordingly, the principles of the local notification method and system described herein capitalise upon this existing functionality, with the notification application 403A at the server 102, upon obtaining respective JSONs from at least two user devices $101_{1,3}$ containing common personally identifiable information data such as a common user identifier, mobile handset number, email address or the like, registers the association pushing the campaign 314 to the second and every further device.

Figure 8:
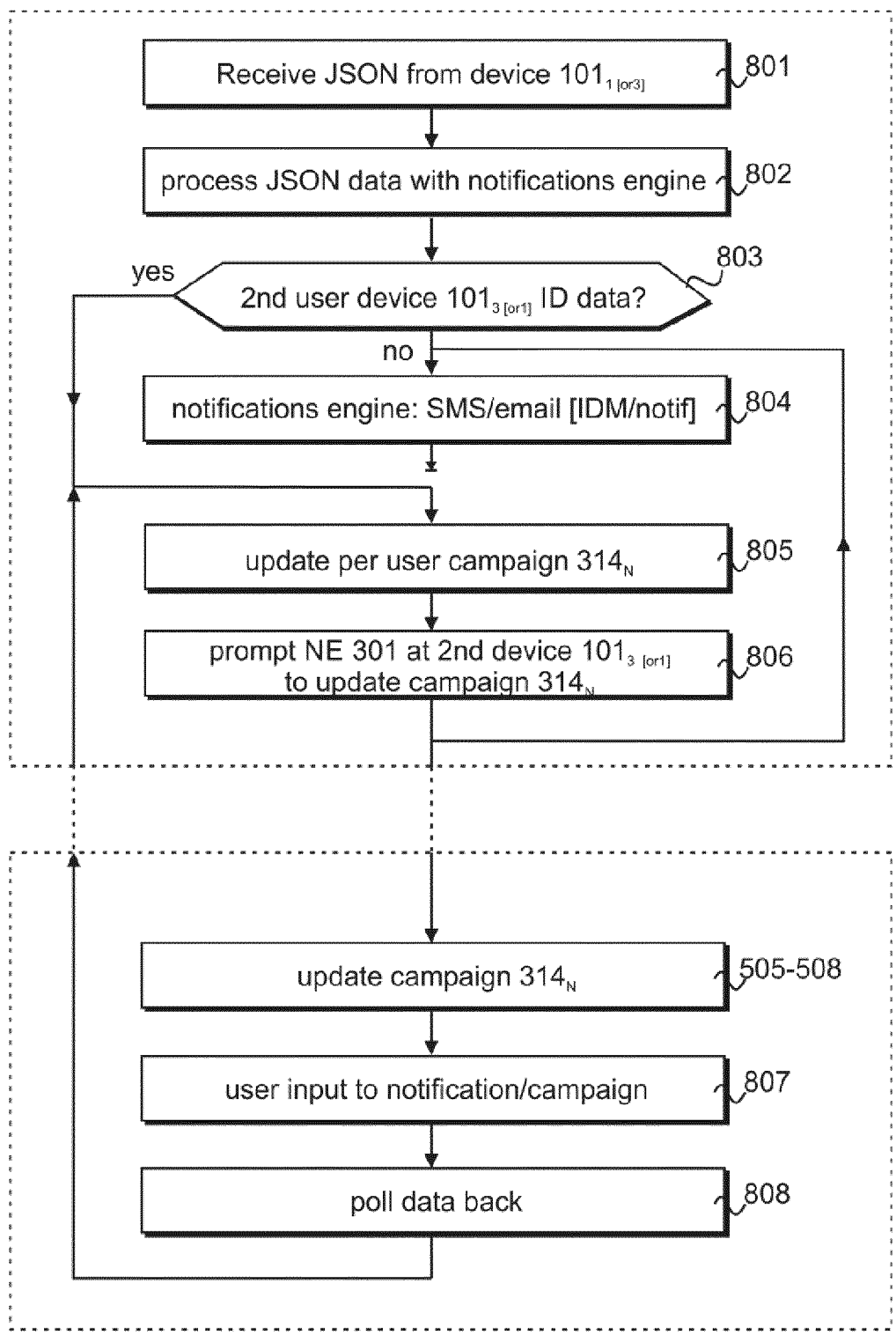
FIG. 8 details data processing steps performed by a set of instructions implementing the alternative method represented in FIG. 7.

FIG. 8 details data processing steps performed by a set of instructions implementing the alternative method represented in FIG. 8, defining an algorithm which may be embodied amongst the core campaign updating steps 505-508 described hereinbefore. Upon receiving a JSON from a first user device $101_1$ at step 801, which may include such data as a user identifier, a user mobile device phone number and/or a user's email address, and also notification data and campaign triggers and settings, optionally assorted with other campaign parameters and/or data representative of email and SMS opt-outs, the notification engine 301 processes same at step 502 and attempts a match against stored equivalent data associated with another installation instance of a same third-party app 410 at a different device $101_3$. A match based on user identifying data such as the user identifier, phone number and/or email address is indicative of an association between the two devices $101_{1,3}$.

Accordingly, a question is asked at step 803, about whether the comparison has identified further device(s). If the question of step 803 is answered negatively, the notification engine outputs a notification 409 at step 804, in this case reporting the matching failure. Alternatively, when the question of step 803 is answered positively, then at step 805 the notification engine 301 updates the status of a stored campaign $314_N$ corresponding to the received notification data and campaign triggers and settings to a per user campaign indicative of user identification-based associated devices. At step 806, the notification engine 301 prompts the remote notification engine 301 at the associated user device $101_3$ to update its equivalent campaign to a per user campaign.

At the second, remote user device $101_3$, the prompt of step 806 is received as a campaign synchronisation event (505) causing the update of the local campaign 314, which is accordingly updated according to steps 506-508, so as to correspond fully in notification data, triggers and settings to the per user campaign 314 of the first matching user device $101_1$. When the user should provide input to a notification 409 at the second user device $101_3$ at step 807, the input data is eventually polled back to the notification engine 301 at the associated first, remote user device $101_1$, and reciprocally, wherein control subsequently returns to the per user campaign update of step 805 and, accordingly, wherein each device 101 of a user associated with another is kept updated of notifications 409 interacted with by the user at at least one device 101. Further, as this updating of remote interaction corresponds to a verification that a notification 409 for a third-party app 410 installed at each of the associated user devices 101 has therefore been output at step 508 at at least one such device, the per user campaign update of step 805 can advantageously delete locally stored notification data corresponding to the remotely-interacted-with notification 409 and thus free storage across one or more secondary user devices 101.

It will be appreciated that at step 510 of FIG. 5 the comparison of logged contextual data against stored campaign trigger event(s) could yield more than one match. In one embodiment of the invention, if the comparison yields more than a single match for a notification which could be generated by an app, at step 511 the system generates that notification which is determined to have the highest priority from the available different notifications. This is achieved by performing a prioritization algorithm in real-time. In one embodiment, the prioritization algorithm evaluates a plurality of parameters in order to determine which of the available notifications has the highest priority at that moment in time, and therefore should be generated by the app.

The parameters of the prioritization algorithm may include contextual data, user selected preferences, past user behavior and aggregated past data. Contextual data may include data such as current device and user data and triggers (e.g. data that a user device is unlocked in a vehicle and connected to wifi, and where the app has not been opened in x number of days). Contextual data also may include the duration of the window for generating a particular notification. For example, in the case where more than one of the notifications available for generation by the app are associated with a location trigger event, that notification associated with a location trigger event which will remain satisfied for the shortest window of time may be determined to be the notification of highest priority (e.g. if a first location trigger event corresponds to when a user is in a particular country, and a second location trigger event corresponds to when the user is within a particular area of the particular country, the notification associated with the second location trigger event will be determined to have a higher priority).

User selected preferences may include for example a user's preference for particular categories of notifications generated by the app, or for the frequency of such notifications output by the app. These preferences may have been previously provided by the user to the app. Past user behavior may comprise stored data regarding a user's past behaviour or interactions with notifications of a similar category or content previously output by the app, which correspond to their implicit preferences. Aggregated past data comprises information regarding which of the available notifications are likely to receive the most favorable response from the user (such as for example by the user clicking on the notification). This information may be obtained by an algorithm trained by the remote server which is associated with the app.

Once the prioritization algorithm has been performed, that notification which is determined to be of highest priority is generated, and in step 512 this generated notification is output to the user interface of the mobile device.

It will be appreciated that each app installed on a mobile device can not directly communicate with another app installed on the same device, as each app is independent and self-functioning. However, in one embodiment of the present invention, the data processing system further provides for the prioritizing of notifications across those apps on a mobile device which originate from the same company. This functionality is facilitated by the provision of a unique identifier which is associated with each app on a mobile device. This identifier can be passed by an app to the backend server in the cloud, in order that the server has information regarding which apps a user has installed on their device.

In accordance with this embodiment of the invention, the backend server can be configured to generate rules in respect of the prioritization of notifications across those apps on a mobile device which originate from the same company (known as cloud side shared preferences). For example, a company may wish to output a single notification to each user of one or more of their apps. In this case, the backend server can be configured to generate criteria for each of the company's apps to satisfy this request which ensures that a notification is only generated from a selected one of the company's apps installed on a user's device, regardless of how many of the company's apps are installed on the user's device. The criteria are determined based on a prioritization algorithm. This prioritization algorithm may include parameters such as when each of the company's apps installed on the user's device were last used by the user, whether notifications are enabled or disabled in respect of each of these apps, and the current installation status of each of the apps. For example, if the prioritization algorithm takes as input a company's AppX (notifications allowed), AppY (second last used by a user/notifications allowed) and AppZ (last used by the user/notifications allowed) installed on a user's device, the algorithm may generate criteria for each of the three apps in accordance with the following: AppZ is selected to generate the notification in question, and neither AppX or AppY generate the notification provided AppZ is installed on the device. However, if AppZ has been uninstalled, AppY is selected to generate the notification instead and AppX again does not generate the notification. In addition, the backend server can be configured to analyse polled logs received from the user's device, and if it is determined that the desired notification was not generated in a timely manner by the selected app, the criteria in respect of each of the company's apps may be updated such that the app determined to be of next highest priority is selected to generate the notification instead.

The data processing system can additionally provide for the sharing of data between those apps on a mobile device which originate from the same company on the device side using "shared preferences". This is performed during the configuration of an app by the app developer. It will be appreciated that this enables developers to share if a notification has been output to a user's device by a particular app, and thus reduce the processing load on the cloud side.

Accordingly the present invention provides a data processing system, and a system implementing the method, for generating a local electronic user notification 409 at a network-capable personal computing device 101$_N$ about a data processing application 410$_N$ stored in the device. A campaign 314 is created for the data processing application 410$_N$, wherein at least one predetermined notification format and at least one predetermined local trigger event are selected. The campaign 314 is pushed to the device 101 when connectivity between the device 101 and the server 102 permits, together with notification data, which is then stored and processed at the device 101 locally, irrespective of whether the device 101 is connected to a network 103, 105, 108. Local hardware and data processing events are monitored by the monitoring manager 306 at the device 101 in real time, and monitored events are compared by same against the or each selected predetermined local trigger. Upon matching at least one selected predetermined local trigger event with at least one monitored event, the monitoring manager 306 causes the notification engine 301 to format the stored first notification data according to a first selected predetermined notification format 314 into the local electronic user notification 409 at the device 101, and to output the local electronic user notification 409 to a user interface 301 of the device 101 independently of a runtime status of the data processing application 410$_N$.

Thus, rather than using remote push notifications with FCM and APNS, the present system caches notification conditions, formats and data for each app installation, wherein the notification application 403B then checks itself against device contextual data and user data in real time to determine a notification generating time deemed most appropriate to the device user, even when the app 410 is in the background or terminated. The method and system of the invention is able to, in real-time, check device and user context triggers and instantly deliver a message 409 (notification, email, SMS, interactive display message (HTML5 pop-up), then record how a user interacts with a notification 409 and report same to the app developer, but also enables follow-on actions, including updating the notification, expiring the notification, sending another notification 409 from another campaign 314$_{N+1}$, sending another type of notification 409 and removing the notification, managing notifications across multiple apps 410$_N$ on one device 101, or across multiple apps 410$_{1-N}$ installed across multiple devices 101$_{1-N}$ for the same user.

The synchronisation provided by the NE 301 in tandem with the Campaign Storing & Synchronising Manager 304 advantageously permits live updating of a notification's content, which is done by the app locally removing the prior notification 409$_{N-1}$ and replacing it with an updated notification 409$_N$ instantly without the user noticing, and in advance of the user seeing the first/prior notification 409$_{N-1}$.

Third-party applications are expected to use the present method and system for delivering general notifications, messages, advertising and updates to users at the most appropriate time for reducing WAN and cellular SMS bandwidth wastage, increasing user interaction rates, and favouring user disposition towards the entity developing third-party apps 410 and operating the server 102.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

What is claimed is:

1. A method for generating a local electronic user notification at a network-capable personal computing device about a data processing application stored in the device, the method comprising the steps of:
- selecting at a remote server at least one predetermined format for a notification associated with the data processing application;
- selecting at the remote server at least one predetermined local trigger event to generate a notification associated with the data processing application;
- associating the or each selected predetermined format for a notification and the or each selected predetermined local trigger event with the data processing application at the device;
- loading and storing first notification data when the personal computing device is connected to a network;
- and, irrespective of whether the personal computing device is connected to a network, monitoring local hardware and data processing events at the device in real time;
  - comparing monitored events against the or each selected predetermined local trigger event;
- and, upon matching at least one selected predetermined local trigger event with at least one monitored event, formatting the stored first notification data according to a first selected predetermined format to generate the local electronic user notification at the device; and
- outputting the generated local electronic user notification to a user interface of the device independently of a runtime status of the data processing application.

2. The method according to claim 1,
- wherein the step of selecting at least one predetermined local trigger event further comprises selecting a plurality of predetermined local trigger events; and
- wherein the step of matching further comprises matching some or all of the plurality of predetermined local trigger events with a respective plurality of monitored events.

3. The method according to claim 1, further comprising selecting at least one threshold parameter for the or each selected predetermined local trigger event.

4. The method according to claim 1,
- wherein the step of formatting further comprises formatting the stored first notification data according to a second selected predetermined format to generate a second local electronic user notification at the device; and
- outputting the generated second local electronic user notification to the user interface of the personal computing device independently of the runtime status of the data processing application.

5. The method according to claim 1, further loading and storing second notification data when the personal computing device is connected to a network;
- wherein, if the stored first notification data has not yet been formatted to generate the local electronic user notification or if the generated local electronic user notification based on the stored first notification data has not yet been output to the display,
- the step of formatting further comprises formatting the stored second notification data according to the first selected predetermined format to generate the local electronic user notification at the device.

6. The method according to claim 1, further prioritizing selected predetermined formats according to selected predetermined local trigger events.

7. The method according to claim 1, further reporting a local electronic user notification display event to a remote server.

8. The method according to claim 1, further associating the network-capable personal computing device with at least a second network-capable personal computing device, whereby the method is independently performed locally at each device.

9. The method according to claim 8 wherein, when a generated local electronic user notification has been output at a first device, the method comprises the further step of deleting stored notification data corresponding to the output notification at the or each associated device.

10. The method according to claim 1, wherein the notification data comprises one or more data transfer objects (DTOs).

11. The method according to claim 1, wherein the or each format is selected from the group comprising a mobile data processing application (app) notification, an interactive display message, an electronic mail communication and a short message service communication.

12. The method according to claim 1, wherein the or each predetermined notification trigger event is selected from the group comprising time, location of the device, beacon, other data processing application(s) stored in the device, connectivity type and/or status of the device, recent call or short message service communication received at or sent by the device, power status of the device, brightness level of the device display, environmental conditions about the device, user device activity, roaming status or condition of the device, memory capacity of the device, identity of a mobile connectivity service provider for the device, device signaling condition and/or status, connection of headphones to the device, noise level about the device, proximity of the device to an external entity, physical orientation of the device, audio volume level of the device, locked or unlocked status of the device operating system, activation of an airplane mode of the device, language of the device operating system, type of the device, run command for the at least one data processing application, a time period elapsed since the run command, a time period elapsed since the at least one data processing application was first stored in the device, elapsed time from the generation of a previous notification by the data processing application, time since last interaction by a user with a notification by the data processing application.

13. The method according to claim 1, further comprising:
- prioritizing the generation of local electronic user notifications at the device according to selected parameters.

14. The method of claim 13, further comprising generating local electronic user notifications about a plurality of data processing applications at the device, and prioritizing the generation of the local electronic user notifications across at least two of the plurality of data processing applications.

15. The method according to claim 13, wherein the parameters are selected from the group comprising: device and user data, user selected preferences, past user behavior and aggregated past data.

16. A system for generating a local electronic user notification at a network-capable personal computing device about a data processing application stored in the device, comprising:
- a remote server comprising a campaign manager module adapted to
  - select at the remote server at least one predetermined format for a notification associated with the data processing application,
  - select at the remote server at least one predetermined local trigger event to generate a notification associated with the data processing application, and associate the or each selected predetermined format and the or each selected predetermined local trigger event with the data processing application at the device;

a campaign storing and synchronizing manager module adapted to load and store first notification data when the personal computing device is connected to a network;

a campaign monitoring manager module adapted to monitor local hardware and data processing events at the device in real time irrespective of whether the personal computing device is connected to a network; and a notification engine adapted to compare monitored events against the or each selected predetermined local trigger event and, upon matching at least one selected predetermined local trigger event with at least one monitored event, to format the stored first notification data according to a first selected predetermined format to generate the local electronic user notification at the device, and to output the generated local electronic user notification to a user interface of the device independently of a runtime status of the data processing application.

17. A user interface for use with the system of claim 16, adapted to receive user input effecting a selection of the or each predetermined format and/or the or each predetermined local trigger event.

18. A computer program product, comprising a non-transitory computer usable medium having a computer readable program code embodied therein, said computer readable program code adapted to be executed to implement a method for generating a local electronic user notification at a network-capable personal computing device about a data processing application stored in the device, the method comprising the steps of:

selecting at least one predetermined format for a notification associated with the data processing application;

selecting at the remote server at least one predetermined local trigger event to generate a notification associated with the data processing application;

associating the or each selected predetermined format for a notification and the or each selected predetermined local trigger event with the data processing application at the device;

loading and storing first notification data when the personal computing device is connected to a network;

and, irrespective of whether the personal computing device is connected to a network, monitoring local hardware and data processing events at the device in real time;

comparing monitored events against the or each selected predetermined local trigger event;

and, upon matching at least one selected predetermined local trigger event with at least one monitored event, formatting the stored first notification data according to a first selected predetermined format to generate the local electronic user notification at the device; and outputting the generated local electronic user notification to a user interface of the device independently of a runtime status of the data processing application.

* * * * *